US007523413B2

(12) United States Patent
Sims (10) Patent No.: US 7,523,413 B2
(45) Date of Patent: Apr. 21, 2009

(54) ORGANIZING SESSION APPLICATIONS (75) Inventor: Lisa K. Sims, McDonough, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 489 days.

(21) Appl. No.: 11/026,693

(22) Filed: Dec. 31, 2004

(65) Prior Publication Data
US 2005/0278654 A1 Dec. 15, 2005

Related U.S. Application Data (60) Provisional application No. 60/579,343, filed on Jun. 14, 2004.

(51) Int. Cl.
G06F 3/048 (2006.01)
G06F 3/00 (2006.01)

(52) U.S. Cl. .................. 715/788; 715/783; 715/802; 719/328

(58) Field of Classification Search ............. 715/781, 715/788, 792, 793, 777, 783, 802; 719/328
See application file for complete search history.

(56) References Cited

U.S. PATENT DOCUMENTS

| 5,678,034 | A |   | 10/1997 | Chew |         |
|-----------|---|---|---------|------|---------|
| 5,757,371 | A |   | 5/1998  | Oran et al. | |
| 5,838,317 | A | * | 11/1998 | Bolnick et al. | 715/764 |
| 5,870,552 | A |   | 2/1999  | Dozier et al. | |
| 5,920,316 | A |   | 7/1999  | Oran et al. | |
| 6,023,272 | A |   | 2/2000  | Malamud | |
| 6,215,490 | B1 |  | 4/2001  | Kaply | |
| 6,275,230 | B1 |  | 8/2001  | Ingrassia, Jr. et al. | |
| 6,473,505 | B1 |  | 10/2002 | Khuc et al. | |
| 6,519,571 | B1 |  | 2/2003  | Guheen | |
| 6,611,498 | B1 |  | 8/2003  | Baker et al. | |
| 6,643,661 | B2 |  | 11/2003 | Polizzi | |
| 6,662,226 | B1 |  | 12/2003 | Wang | |
| 6,738,817 | B1 |  | 5/2004  | Chen | |
| 6,941,371 | B2 |  | 9/2005  | Hartmann | |

(Continued)

OTHER PUBLICATIONS http://web.archive.org/web/20040306185255/www.corizon.com/benefits.html benefits: overview Mar. 6, 2004 (printed Dec. 23, 2006); 1 page.

(Continued)

Primary Examiner—Ting Zhou
(74) Attorney, Agent, or Firm—Thomas, Kayden, Horstemeyer & Risley, LLP (57) ABSTRACT Embodiments of the present disclosure provide systems and methods for organizing session applications. Briefly described, in architecture, one embodiment of the system, among others, includes logic configured to display a user interface for initiating a command to launch a business application on a computer display of a user; logic configured to associate a launched business application with a user-session; logic configured to display all of the business applications of an active session on the computer display; a first user interface control for allowing a user to initiate a command for organizing the displayed applications of the active session in a predetermined alignment across the computer display; and logic configured to arrange the displayed application of the active session after receiving the command from the user. Other systems and methods are also provided.

12 Claims, 10 Drawing Sheets

U.S. PATENT DOCUMENTS

| | | | |
|---|---|---|---|
| 6,983,155 | B1 | 1/2006 | Cook |
| 7,100,195 | B1 | 8/2006 | Underwood |
| 7,225,244 | B2 | 5/2007 | Reynolds et al. |
| 7,263,655 | B1 | 8/2007 | Carden, Jr. |
| 2001/0029534 | A1 | 10/2001 | Spinks et al. |
| 2001/0047417 | A1 | 11/2001 | Hartmann |
| 2002/0111824 | A1 | 8/2002 | Grainger |
| 2003/0009752 | A1 | 1/2003 | Gupta |
| 2003/0071849 | A1* | 4/2003 | Ferri .......................... 345/777 |
| 2003/0088640 | A1* | 5/2003 | Rasheed et al. ............. 709/217 |
| 2003/0189597 | A1 | 10/2003 | Anderson |
| 2004/0010574 | A1 | 1/2004 | Cammick |
| 2004/0028212 | A1 | 2/2004 | Lok et al. |
| 2004/0103409 | A1 | 5/2004 | Hayner |
| 2004/0117376 | A1 | 6/2004 | Lavin |
| 2004/0191744 | A1 | 9/2004 | Guirguis |
| 2004/0203750 | A1 | 10/2004 | Cowdrey et al. |
| 2004/0261037 | A1* | 12/2004 | Ording et al. ............... 715/788 |
| 2005/0063530 | A1 | 3/2005 | Cook et al. |
| 2005/0066037 | A1 | 3/2005 | Song |
| 2005/0153706 | A1 | 7/2005 | Niemenmaa et al. |
| 2005/0172235 | A1* | 8/2005 | Cragun et al. ............... 715/744 |
| 2007/0219842 | A1 | 9/2007 | Bansal et al. |

OTHER PUBLICATIONS http://web.archive.org/web/20040310140931/www.corizon.com/enterprise_features.html platform enterprise edition features: 1-3 Mar. 10, 2004 (printed Dec. 23, 2006); 3 pages.
http://web.archive.org/web/20040216191845/www.corizon.com/solutions.html Corizon Solution Feb. 16, 2004 (printed Dec. 23, 2006); 1 page.
http://web.archive.org/web/20040504231018/www.corizon.com/platform_overview.html Corizon Platform Overview May 4, 2004 (printed Dec. 23, 2006); 1 page.
http://web.archive.org/web/20040313213357/www.corizon.com/it_benefits.html Benefits for IT organisations Mar. 13, 2004 (printed Dec. 23, 2006); 1 page.
http://web.archive.org/web/20040407091225/www.corizon.com/user_benefits.html benefits for users Apr. 7, 2004 (printed Dec. 23, 2006); 1 page.
http://web.archive.org/web/20040603045823/www.netmanage.com/products/rumba/rumbaOffice.asp Rumba Office and ViewNow Jun. 3, 2004 (printed Dec. 23, 2006); 2 pages.
http://web.archive.org/web/20040603045823/http://www.netmanage.com/products/pdf/datasheets/52078-RUMBA-ENT-DS-04-04.pdf Windows-Based and Browser-Based Multi-Host Access for Evolving Enterprises Jun. 3, 2004 (printed Dec. 23, 2006); 2 pages.
http://web.archive.org/web/20040126023051/www.netmanage.com/hap/hap_access.asp Access Services Jan. 26, 2004 (printed Dec. 23, 2006); 1 page.
http://web.archive.org/web/20040404202850/www.netmanage.com/hap/hap_integration.asp Integration Services Apr. 4, 2004 (printed Dec. 23, 2006); 2 pages.
http://web.archive.org/web/20040603045044/www.netmanage.com/products/rumba/index.asp Powerful Host Access for the Evolving Enterprise Jun. 3, 2004 (printed Dec. 23, 2006); 2 pages.
http://web.archive.org/web/20040603082621/www.netmanage.com/products/rumba/rumbaw2h.asp Powerful, Secure, Easy-To-Deploy Host Access Jun. 3, 2004 (printed Dec. 23, 2006); 2 pages.
http://web.archive.org/web/20040402102021/www.netmanage.com/hap/hap_presentation.asp Presentation Services Apr. 2, 2004 (printed Dec. 23, 2006); 2 pages.
http://web.archive.org/web/20040125114121/http://toolbar.google.com/ Google Toolbar Jan. 25, 2004 (printed Dec. 23, 2006); 1 page.
http://web.archive.org/web/20040204014210/toolbar.google.com/menu_help.html Google Toolbar Feb. 4, 2004 (printed Dec. 23, 2006); 3 pages.
http://web.archive.org/web/20040217111141/toolbar.google.com/options_help.html Google Toolbar Options Feb. 17, 2004 (printed Dec. 23, 2006); 4 pages.
http://web.archive.org/web/20031206080131/toolbar.google.com/button_help.html Google Toolbar Features Dec. 6, 2003 (printed Dec. 23, 2006); 6 pages.
http://www.smartcomputing.com/editorial/article.asp?article=articles/archive/office97/09704/09704.asp&guid= Take a Shortcut to Office 87 Sep. 1998, vol. 2, Issue 3 of Smart Computing (printed Dec. 23, 2006); 7 pages.
http://www.codeproject.com/CSHARP/CSDOESSHELL3.ASP C# does Shell, Part 3 Mar. 3, 2003 (printed Dec. 23, 2006); 19 pages.
http://www.siebel.com/products/service/call_center/support_for_multiple_c.shtm May 25, 2004; 2 pages.
Microsoft Contact Center Framework White Paper Dec. 2003; 17 pages.
Microsoft Contact Center Framework A Guide to Business Benefits Dec. 2003; 13 pages.
http://web.archive.org/web/20040402102021/www.netmanage.com/hap/hap_presentation.asp; Presentation Services; Apr. 2, 2004 (printed Dec. 23, 2006); 2 pages.
Omanson, R., Non-Final Rejection mailed Oct. 9, 2007, U.S. Appl. No. 11/026,689, filed Dec. 31, 2004.
Sims, L., Non-Final Rejection mailed Aug. 22, 2007, U.S. Appl. No. 11/027,325, filed Dec. 31, 2004.
Sims, L., Non-Final Rejection mailed Jul. 27, 2007, U.S. Appl. No. 11/027,324, filed Dec. 31, 2004.
Chand, S., Non-Final Rejection mailed Oct. 9, 2007, U.S. Appl. No. 11/026,677, filed Dec. 31. 2004.
Omanson, U.S. Appl. No. 11/026,689, filed Dec. 31, 2004.
Sims; U.S. Appl. No. 11/027,325, filed Dec. 31, 2004.
Sims; U.S. Appl. No. 11/026,679, filed Dec. 31, 2004.
Sims, U.S. Appl. No. 11/026,693, filed Dec. 31, 2004.
Bracey, U.S. Appl. NO. 11/026,788, filed Dec. 31, 2004.
Chand, U.S. Appl. No. 11/026,677, filed Dec. 31, 2004.
McGlennon; Non-Final Rejection mailed Jun. 13, 2008 for U.S. Appl. No. 11/026,695, filed Dec. 31, 2004.
Sims; Non-Final Rejection mailed Jun. 9, 2008 for U.S. Appl. No. 11/027,324, filed Dec. 31, 2004.
Sims; Final Rejection mailed May 21, 2008 for U.S. Appl. No. 11/026,679, filed Dec. 31, 2004.
Chand; Final Rejection mailed Apr. 16, 2008 for U.S. Appl. No. 11/026,677, filed Dec. 31, 2004.
Bracey; Non-Final Rejection mailed Sep. 26, 2008 for U.S. Appl. No. 11/026,788, filed Dec. 31, 2004.
Chand; Non-Final Rejection mailed Sep. 26, 2008 for U.S. Appl. No. 11/026,677, filed Dec. 31, 2004.
Omanson; Non-Final Rejection mailed Sep. 30, 2008 for U.S. Appl. No. 11/026,689, filed Dec. 31, 2004.
McGlennon; Examiner Interview Summary mailed Aug. 14, 2008 for U.S. Appl. No. 11/026,695, filed Dec. 31, 2004.
Sims; Examiner Interview Summary mailed Aug. 14, 2008 for U.S. Appl. No. 11/027,325, filed Dec. 31, 2004.
Sims; Examiner Interview Summary mailed Aug. 13, 2008 for U.S. Appl. No. 11/027,324, filed Dec. 31, 2004.
Sims, U.S. Appl. No. 11/027,324, filed Dec. 31, 2004.
Sims; Final Rejection mailed Nov. 20, 2008 for U.S. Appl. No. 11/027,324 filed Dec. 31, 2004.

* cited by examiner

ORGANIZING SESSION APPLICATIONS

CROSS-REFERENCE TO RELATED APPLICATION

This application claims priority to U.S. provisional application entitled, "Presentation System," having Ser. No. 60/579,343, filed Jun. 14, 2004, which is entirely incorporated herein by reference.

This application is related to copending U.S. utility patent application entitled "Frameless Presentation System" filed on the same date as the present application and accorded Ser. No. 11/026,695, which is entirely incorporated herein by reference; U.S. utility patent application entitled "Navigational Controls for a Presentation System" filed on the same date as the present application and accorded Ser. No. 11/026,689, which is entirely incorporated herein by reference; U.S. utility patent application entitled "Multiple Application Viewing" filed on the same date as the present application and accorded Ser. No. 11/027,325, which is entirely incorporated herein by reference; U.S. utility patent application entitled "Viewing Applications from Inactive Sessions" filed on the same date as the present application and accorded Ser. No. 11/026,679, which is entirely incorporated herein by reference; U.S. utility patent application entitled "Floating User Interface" filed on the same date as the present application and accorded Ser. No. 11/027,324, which is entirely incorporated herein by reference; U.S. utility patent application entitled "Tracking User Operations" filed on the same date as the present application and accorded Ser. No. 11/026,788, which is entirely incorporated herein by reference; and U.S. utility patent application entitled "Administration Manager" filed on the same date as the present application and accorded Ser. No. 11/026,677, which is entirely incorporated herein by reference.

TECHNICAL FIELD

The present disclosure is generally related to computer systems and, more particularly, is related to managing computer applications.

BACKGROUND

Many desktop presentation systems, such as those in use within call center environments, pose significant challenges in user productivity. For example, multiple user interface technologies, desktops, and metaphors are pervasive within today's call center environments, including for example, web browsers, X/Motif emulators, TN3270, and PC-based graphical user interfaces (GUIs). Accordingly, a user in an environment such as a call center, in which a variety of different applications often need to be employed on a computer desktop at the same time, can have difficulty managing, organizing, and effectively operating the different applications. Accordingly, user interfaces should be designed to accommodate such conditions or environments.

Thus, a heretofore unaddressed need exists in the industry to address the aforementioned deficiencies and inadequacies.

SUMMARY

Embodiments of the present disclosure provide systems and methods for organizing session applications. Briefly described, in architecture, one embodiment of the system, among others, includes logic configured to display a user interface for initiating a command to launch a business application on a computer display of a user; logic configured to associate a launched business application with a user-session; logic configured to display all of the business applications of an active session on the computer display; a first user interface control for allowing a user to initiate a command for organizing the displayed applications of the active session in a predetermined alignment across the computer display; and logic configured to arrange the displayed application of the active session after receiving the command from the user.

Embodiments of the present disclosure can also be viewed as providing methods for organizing session applications. In this regard, one embodiment of such a method, among others, can be broadly summarized by the following steps: establishing a single user interface on a display of a computer that provides access to a plurality of business computer processes and manages user-sessions on the computer; establishing an active user session, the active user session having at least one computer application associated with the active user session; displaying a plurality of respective representations for corresponding respective computer applications of the active session on the display of the computer; generating a command to organize the displayed computer applications of the active session in a predetermined alignment on the computer display; and arranging the displayed computer applications of the active session in the predetermined alignment, after receiving the command.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
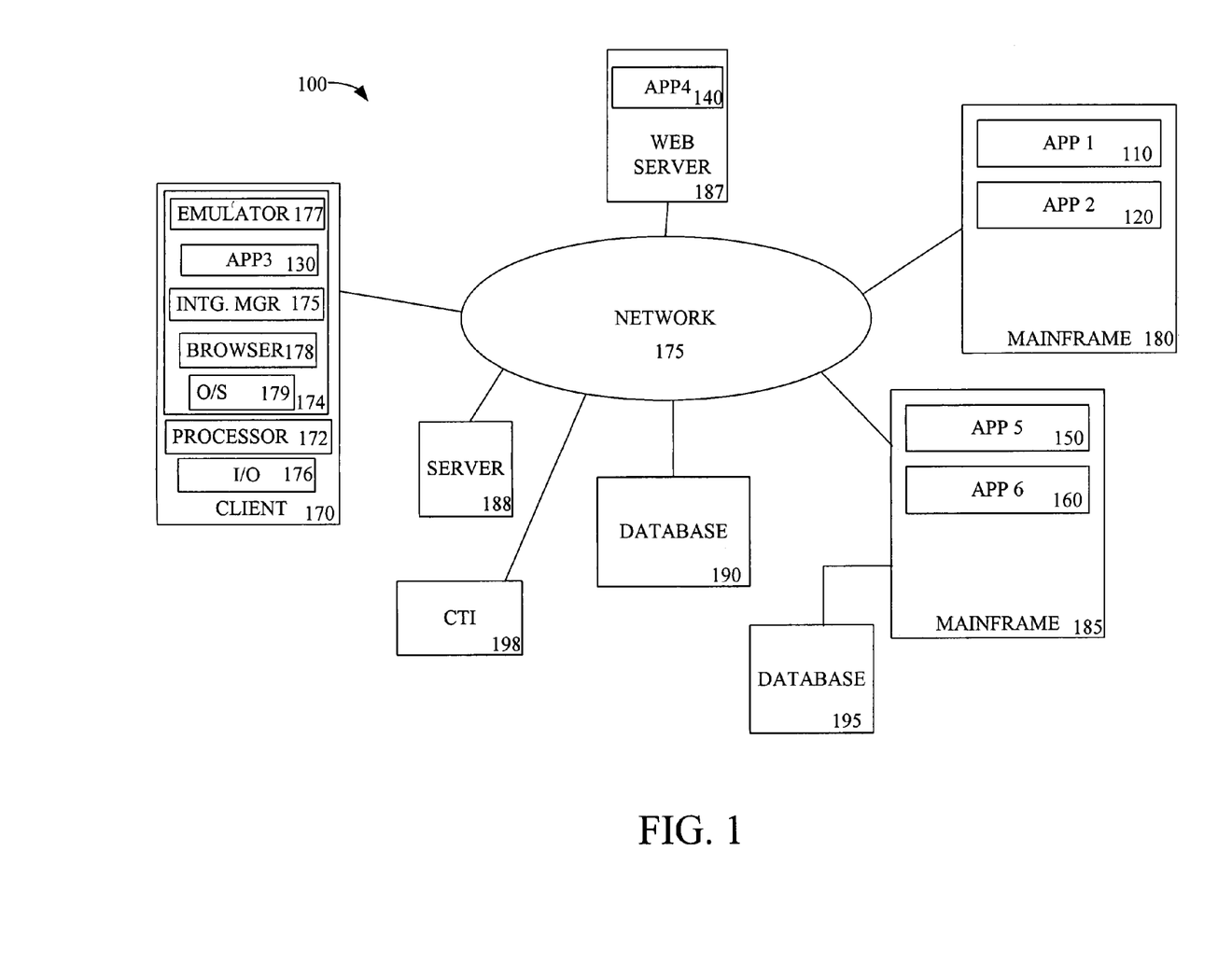
FIG. 1 is a block diagram of one embodiment, among others, of a composite application system.

FIG. 1 shows one embodiment of a composite application system 100 for coordinating the presentation of data from multiple computer applications in a task-oriented environment, such as an environment involving a business activity (e.g., a call-center environment, banking, accounting, etc.). The composite application system 100 in FIG. 1 comprises a general-purpose computer 170 connected to a computer network 105, such as the Internet, Intranet, local area network (LAN), wide area network (WAN), etc. Also connected to the computer network 105 are other computing devices, such as mainframe computers 180-185, servers 187-188, and network databases 190-195 that contain computer applications and data. A variety of computer applications 110-160 may be installed on mainframe computers 180-185. In addition, web-based applications 140 may be installed on the servers 187-188; and data accessed by these applications may be stored on the databases 190-195. For some embodiments, a computer telephone integration system 198 is included to retrieve data from an interactive voice response system (not shown) and route the data to an appropriate user client as a screen pop that is pre-populated with information and may launch a new user-session.

Typically in a business enterprise, mainframe computers 180-185 execute a variety of line of business (LOB) applications which may include older computer systems that are critical to the operation of the enterprise and are generally referred to as legacy systems 110-120, 150-160. To access legacy systems or applications 110-120, 150-160 on a mainframe computer or host 180-185, a terminal (e.g. IBM 3270) with little processing capacity was traditionally utilized, since most of the processing took place at the host or mainframe computer. The host transmitted formatted screens of character-based data to the terminal that were displayed on the terminal screen. Unlike general-purpose computers of today, a user cannot jump from program to program in a legacy system or use the operating system to transfer data from one program to another. Each screen had to be individually requested from the host, and therefore, it might take several seconds to transition from screen to screen. In addition, a user may need to log out of a session of one legacy application 110 so that the user could access a screen of another legacy application 120, 150-160. Such terminals are outdated today, since these systems often run on obsolete hardware and software and may no longer be maintainable or expandable.

Because the logic required to run legacy systems reflects a significant investment, owners of legacy systems are understandably reluctant to discard them. One possible answer is to install a software terminal emulator 177 in the general-purpose computer 170 that enables it to operate as though it was a character-based terminal. With the emulator installed, the general-purpose computer 177 looks like a standard terminal to the host 180-185.

As shown, the general-purpose computer 170 includes a variety of applications 130, 175, 178 also loaded into memory of the general-purpose computer 170. Generally, in terms of hardware architecture, as shown in FIG. 1, the computer 170 includes a processor 172, memory 174, and one or more input and/or output (I/O) devices 176 (or peripherals) that are communicatively coupled via a local interface (not shown). The local interface can be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 172 is a hardware device for executing software, particularly that stored in memory 174. The processor 172 can be any custom made or commercially available processor, a central processing unit (CPU), an auxiliary processor among several processors associated with the computer 170, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company®, an 80x86 or Pentium® series microprocessor from Intel Corporation®, a PowerPC® microprocessor from IBM®, a Sparc® microprocessor from Sun Microsystems, Inc®, or a 68xxx series microprocessor from Motorola Corporation®.

The memory 174 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 174 may incorporate electronic, magnetic, optical, and/or other types of storage media. Note that the memory 174 can have a distributed architecture, where various components are situated remote from one another, but can be accessed by the processor 172.

The software in memory 174 may include one or more separate programs, each of which comprises an ordered listing of executable instructions for implementing logical functions. In the example of FIG. 1, the software in the memory 174 includes a coordination manager 175 in accordance with the present disclosure; a suitable operating system (O/S) 179; terminal emulator 177; and a web browser application 178. A nonexhaustive list of examples of suitable commercially available operating systems 179 is as follows: (a) a Windows® operating system available from Microsoft Corporation®; (b) a Netware® operating system available from Novell, Inc.®; (c) a Macintosh® operating system available from Apple Computer, Inc®; (d) a UNIX® operating system, which is available for purchase from many vendors, such as the Hewlett-Packard Company®, Sun Microsystems, Inc.®, and AT&T Corporation®; (e) a LINUX® operating system, which is freeware that is readily available on the Internet; (f) a run time Vxworks® operating system from WindRiver Systems, Inc.®; or (g) an appliance-based operating system, such as that implemented in handheld computers or personal data assistants (PDAs) (e.g., PalmOS® available from Palm Computing, Inc.®, and Windows CE® available from Microsoft Corporation®). The operating system 179 controls the execution of other computer programs, such as the coordination manager 175, and provides scheduling, input-output control, file and data management, memory management, and communication control and related services.

According to an exemplary embodiment, the coordination manager 175 is a source program, executable program (object code), script, or any other entity comprising a set of instructions to be performed. When a source program, then the program needs to be translated via a compiler, assembler, interpreter, or the like, which may or may not be included within the memory 174, so as to operate properly in connection with the O/S 179. Furthermore, the coordination manager 175 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 176 may include input devices, for example but not limited to, a keyboard, mouse, scanner, microphone, etc. Furthermore, the I/O devices 176 may also include output devices, for example but not limited to, a printer, display, etc. Finally, the I/O devices 176 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 170 is a PC, workstation, or the like, the software in the memory 174 may further include a basic input output system (BIOS) (omitted for simplicity). The BIOS is a set of software routines that initialize and test hardware at startup, start the O/S 179, and support the transfer of data among the hardware devices. The BIOS is stored in ROM so that the BIOS can be executed when the computer 170 is activated.

When the computer 170 is in operation, the processor 172 is configured to execute software stored within the memory 174, to communicate data to and from the memory 174, and to generally control operations of the computer 170 pursuant to the software. The coordination manager 175, the O/S 179, and other local applications 130, 178, etc. in whole or in part, but typically the latter, are read by the processor 172, perhaps buffered within the processor 172, and then executed.

Referring back to FIG. 1, the coordination manager 175 included in the general purpose computer 170 manages the displaying of multiple computer applications 110-160, including legacy applications 110-120, 150-160 located on mainframe computers 180-185. Typically, users (such as sales agents in a call-center environment) located in different geographical locations access LOB applications via their locally installed coordination manager applications 175. The coordination manager 175, in some embodiments, comprises a user interface that is represented in a visual form of an application bar (e.g., a toolbar interface) on a desktop of the general-purpose computer 170. Generally, an application bar is a Windows control that allows a user to perform some actions by clicking a button on the application bar. An application bar often simplifies a user's job by bringing the most accessible actions as buttons that can be directly accessed by the user.

Generally, the coordination manager 175 coordinates the presentation of data on the desktop of the general purpose computer 170 or another display from other computer applications. In one embodiment, the coordination manager 175 provides a usable and efficient user interface to manage multiple applications and user sessions as well as to organize the user desktop and to promote efficient work processes. The coordination manager 175, in some embodiments, includes Application Integration Framework (AIF) and computer telephony interaction (CTI) abstraction.

In one embodiment, among others, of the composite application system, coordination manager 175 utilizes Microsoft® Contact Center framework version 1.0, which runs on Microsoft .Net® Framework version 1.1. Further, some embodiments of the coordination manager are integrated with additional solution components such as single sign-on, agent profiling, and event/interaction logging. For example, some embodiments of the coordination manager 175 maintain and manage an encrypted password store that is called when a user wants to log into a given application.

Figure 2:
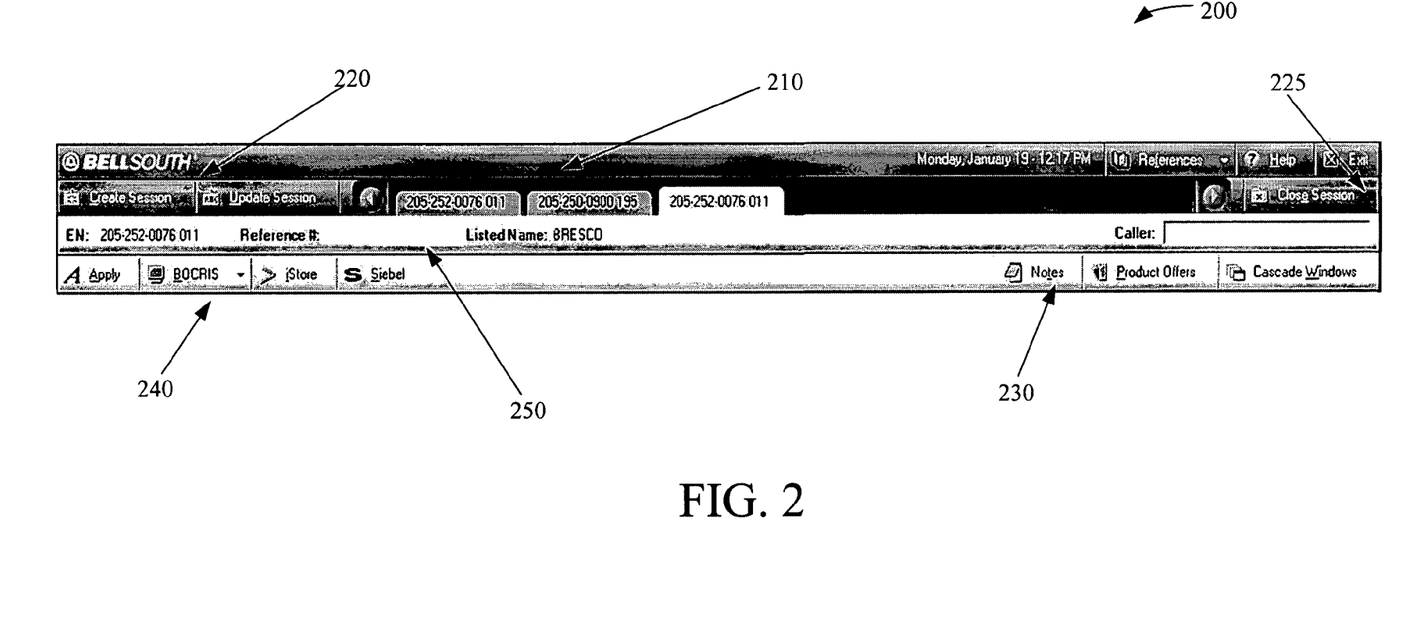
FIG. 2 is a diagram showing one embodiment, among others, of a toolbar user interface element of the composite application system of FIG. 1.

In one embodiment, among others, the coordination manager 175 contains the following primary user interface elements: graphical toolbar interface, user-session navigator, and notepad application. The toolbar provides access to the core coordination manager functionality including user-session opening/closing and launching applications. FIG. 2 contains an example toolbar 200 to illustrate the user interface (UI) elements.

The session display 210 indicates the currently active sessions where a session may be generally referred to as a group of applications that are associated with a common subject or task. The session display 210 could take the form of a tab bar, drop down list, or any control that allows the user to choose a session. When the user chooses a session from the session display 210, the currently active session's applications are hidden, and the new session's applications are displayed. The session management buttons 220, 225 control the opening and closing of sessions. When the user clicks the 'Open Session' button 220, a new session is created, displayed, and updated. Conversely, if the user clicks the 'Close Session' button 225, the current session is closed, removed from the session display, and the next session on the tab bar or in the list is made active.

Tool buttons 230 launch additional tools such as a user-session navigator interface or notepad application. When the user clicks on a tool button 230, the tool opens and receives focus. Application buttons 240 launch applications (e.g., local applications and remote applications stored on a mainframe computer) implemented by the coordination manager 175. When the user clicks an application button 240, a new instance of the hosted application opens and receives focus. Utilizing a single sign-on solution, the hosted application then authenticates the user if necessary.

Figure 3:
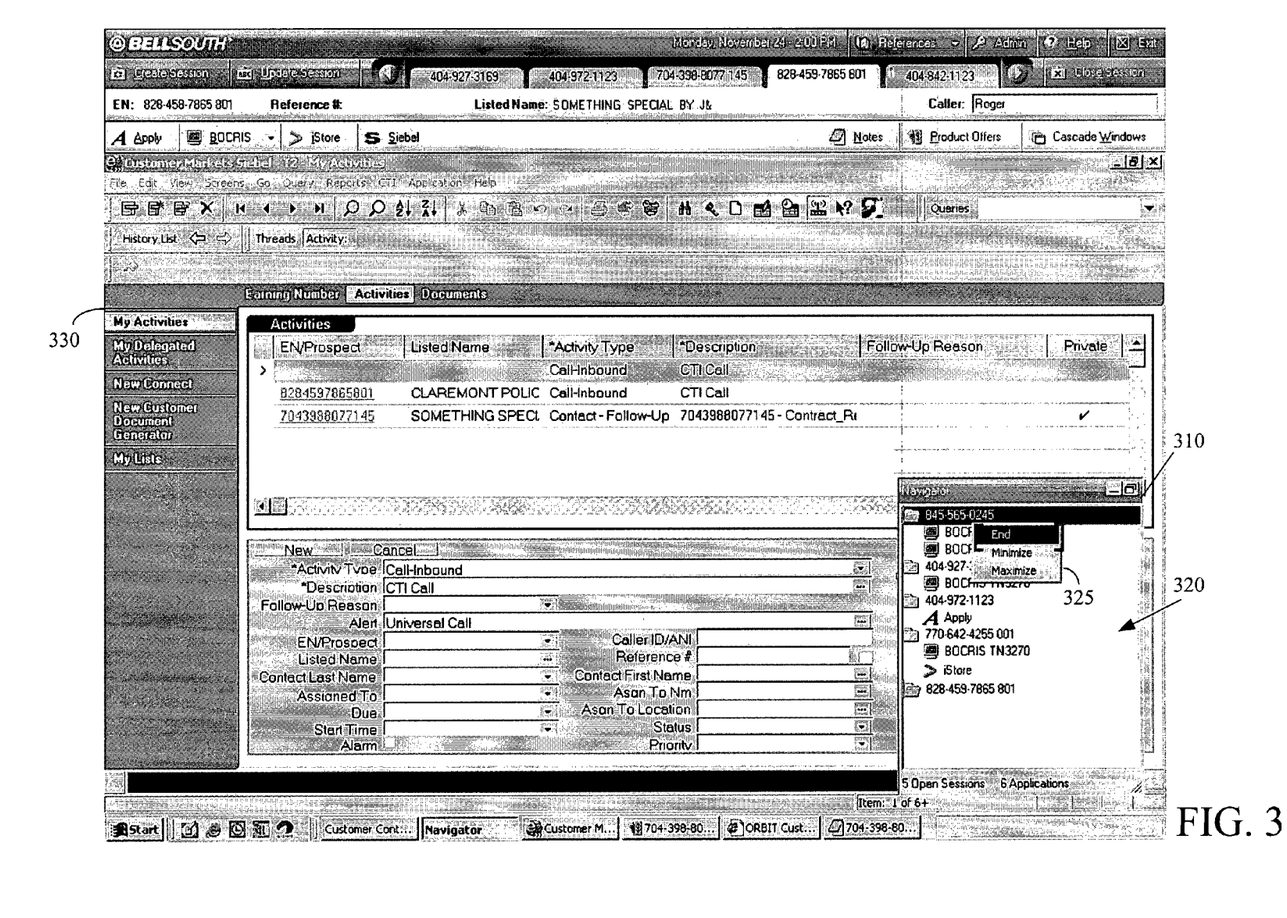
FIG. 3 is a screenshot diagram showing one embodiment, among others, of a desktop arrangement of user interface elements of the composite application system of FIG. 1.

The session information display 250 displays information about the current session such as phone number, customer name, etc. and updates whenever the user changes the active session. In some embodiments, a floating user-session navigator interface 310, as depicted in a screenshot of one embodiment 300 of a desktop arrangement of the composite application system 100 in FIG. 3, provides a summary of the current open sessions in the desktop and allows the user to switch seamlessly between them. A session view control 320 displays all of the user's active sessions either in a tree control or in a 'collapsed' button view. When a user clicks on a session within the view 320, the current session's applications are hidden and the new session's applications displayed. If a user clicks on an individual application within the current session, the application is brought forward and receives focus. The session view 320 may also contain functionality to display an application instance not within the current session. For example, if the user clicks on an application not within the current session, the application is displayed in the current context and receives focus. In this way, the composite application system 100 allows a user to quickly see what applications are open within each session and allows the user to choose to pull an application from one session (e.g., an inactive session) into another session (e.g., an active session) through the use of the user-session navigator interface 310. In this way, a user can easily switch back and forth between sessions, and all of the applications within a session maintain their state.

To aid in usability, a floating session navigator 310 is provided as part of the composite application system 100 for some embodiments. Accordingly, the user-session navigator 310 is not bound or restricted to a frame or border of another application or interface. The user-session navigator 310 can be moved about the desktop 330 as needed or desired by a user. In addition to moving the user-session navigator window 310 to different portions of the desktop 330, the user can minimize the session navigator window, and change the session view between expanded and collapsed view (by selecting a minimize or maximize option from a right-click menu 325, for example). In some embodiments, the user-session navigator 310 is configured to remain at the top of the desktop and not hidden by other window displays.

Generally, within a Windows environment, a session is identified by a session identifier, and the graphical window controls representing the applications that have been launched during the respective session are identified by respective Globally Unique Identifiers (GUIDs). Therefore, a first session may be uniquely identified and associated with a first GUID and a second GUID. Accordingly, a second session may be uniquely identified and associated with a third GUID.

One embodiment of the coordination manager application 175 is built-on Microsoft's .NET® Framework. Accordingly, one embodiment provides a hosted web application class with which to integrate web applications. The hosted web application class contains an ActiveX® version of Microsoft's Internet Explorer® web browser and implements the hosted application interface. ActiveX® web browser executes actions via a scripting language or by redirecting to a specific uniform resource locator (URL). To implement more advanced action functionality, an enhanced hosted web application class is created that allows the execution of successive actions defined by an XML-based macro language. The XML macro language supports the ability to perform successive requests, populate form fields, and execute conditional logic. Actions defined in the XML macro language can be modified without requiring recompilation, allowing for additional extensibility following deployment.

If the XML macro language is insufficient to execute all of the necessary functionality or cannot interface with a web application due to embedded objects such as applets or ActiveX® control, the web application can be wrapped within a .NET Windows® form containing the ActiveX® version of the Internet Explorer® web browser (or some other compatible web browser, for example) and specific code written in the form to interface with the application. Alternatively, if possible, the web application itself could be modified to process actions passed via web request.

In order for an application to be hosted by the coordination manager 175, the application typically implements a hosted application interface. The application host interacts with a variety of classes including windows forms and web applications. Some embodiments of the coordination manager 175 provides an external hosted application class to integrate with applications that enable scripting via JavaScript® or VBScript® but cannot actually be hosted within the coordination manager user interface like a Windows control or a web application. Such applications include the Microsoft Office® suite products: Word®, Excel®, etc. The external hosted application implements the hosted application interface and executes actions utilizing the scripting language. If an application provides an Activex® interface, the Activex® control is hosted within a .NET Windows® user control in order to integrate the application within the coordination manager 175. The user control implements the hosted application interface to allow the application host to integrate with the application. The Windows Form executes actions by calling the API exposed by the Activex® control. Once the Activex® control is "wrapped" in the user control, the application is incorporated into the framework as previously described.

If an application provides a COM interface, the application is hosted by creating a .NET Windows® user control to integrate with the application via the COM interface. The user control allows the user interface to display information from the application. The user control implements the hosted application interface to allow the application host to integrate with the application. To execute actions, the user control calls methods exposed by the COM application. The user control is incorporated into the coordination manager 175, as previously described.

In some embodiments, data access and data update is typically done via web services. The web services use .NET Framework data to access a server 188 (e.g., SQL server) as the data source. If an application provides a web service interface, the application is hosted by creating a .NET Windows® user control to integrate with the application via the web service. Similar to the COM application, the user control provides the user interface to display information from the application. The user control implements the hosted application interface to allow the application host to integrate with the application. To execute actions, the user control calls web methods exposed by the web service. The user control is incorporated into the coordination manager 175, as previously described.

At initialization, the coordination manager 175 creates the application host object. The application host object requests application information from web services. The coordination manager 175 utilizes this information to populate the application bar 200 and any other user interface elements (such as user-session navigator 310). Following initialization, the coordination manager 175 sends commands to and receives events from the application host in order to manage sessions. For example, when the user clicks on the application bar, the coordination manager 175 requests a new application instance from the application host. The application host creates a new instance and returns it to the coordination manager 175. When the user asks for an action to be performed (task, focus, etc.), the coordination manager 175 requests the action from application host. The application host finds the appropriate application by session and instance and requests the action. The hosted application then performs the action. The coordination manager 175 can also share data between applications utilizing actions. When requesting an action, the coordination manager 175 can provide the application host with an XML string containing any data specific to that action. When the hosted application executes the action, it can utilize the data appropriately. Such data sharing can prevent re-keying of information, such as customer name and telephone number, for example.

Figure 4:
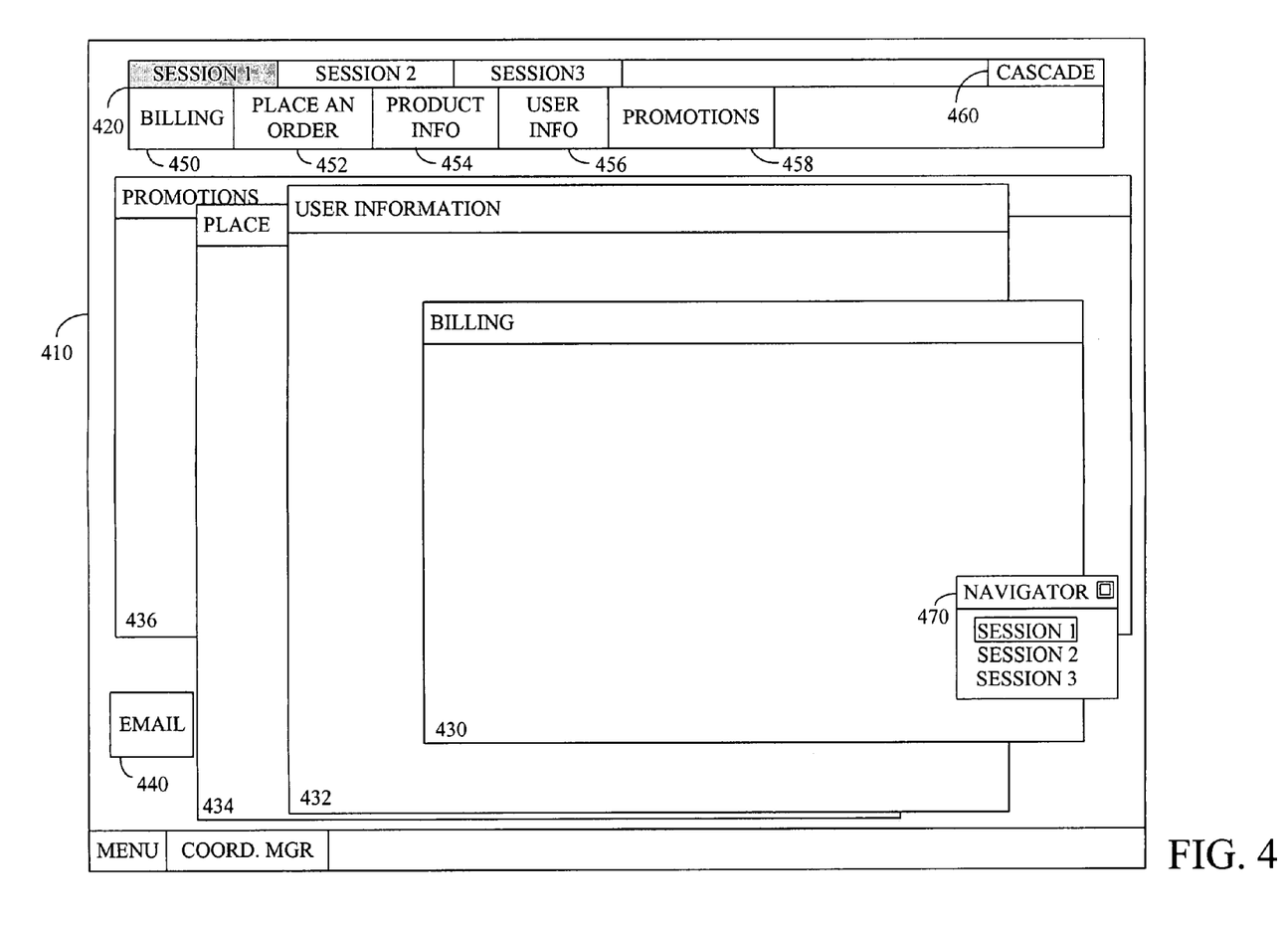
FIG. 4 is a diagram of one embodiment, among others, of a desktop arrangement of the composite application system of FIG. 1.

FIG. 4 shows one embodiment of a desktop arrangement of the composite application system 100. As shown in FIG. 4, a desktop 410 is presented with an application bar or toolbar interface 420. The application bar 420 is a user interface to the composite application system 100. In the embodiment shown, a user has utilized the application bar 420 to display information from a "Billing" application 430, a "User Information" application 432, a "Place an Order" application 434, and a "Promotions" application 436. As shown, for this embodiment, each application is displayed in a graphical window control that is not contained within a single frame or border of the application bar interface 420. Each graphical window control 430-436 can be moved about the desktop 410 as the user chooses. In this way, a user can utilize all of the displayed area of the desktop 410 to arrange graphical window controls in the manner that the user chooses. For example, a user can arrange the graphical window controls 430-436 to ensure that an icon on the desktop 410 (e.g., an email application icon 440) is readily accessible by the user. In this way, the composite application system 100 provides representations of computer applications of a user-session to float independently within the desktop environment. However, the coordination manager 175 still manages the presentation of applications launched from the application bar interface 420 by sharing data between the applications, providing ability to tile/cascade launched windows, etc. Many business applications need such a "frameless" approach in order to make efficient use of all of the available area on a desktop. Application buttons 450, 452, 454, 456, 458 are provided on the application bar interface 420 to launch other computer applications (as generally shown by windows 430-436). Further, a user-session navigator interface 470 is provided to enable a user to switch between different user sessions.

Figure 5:
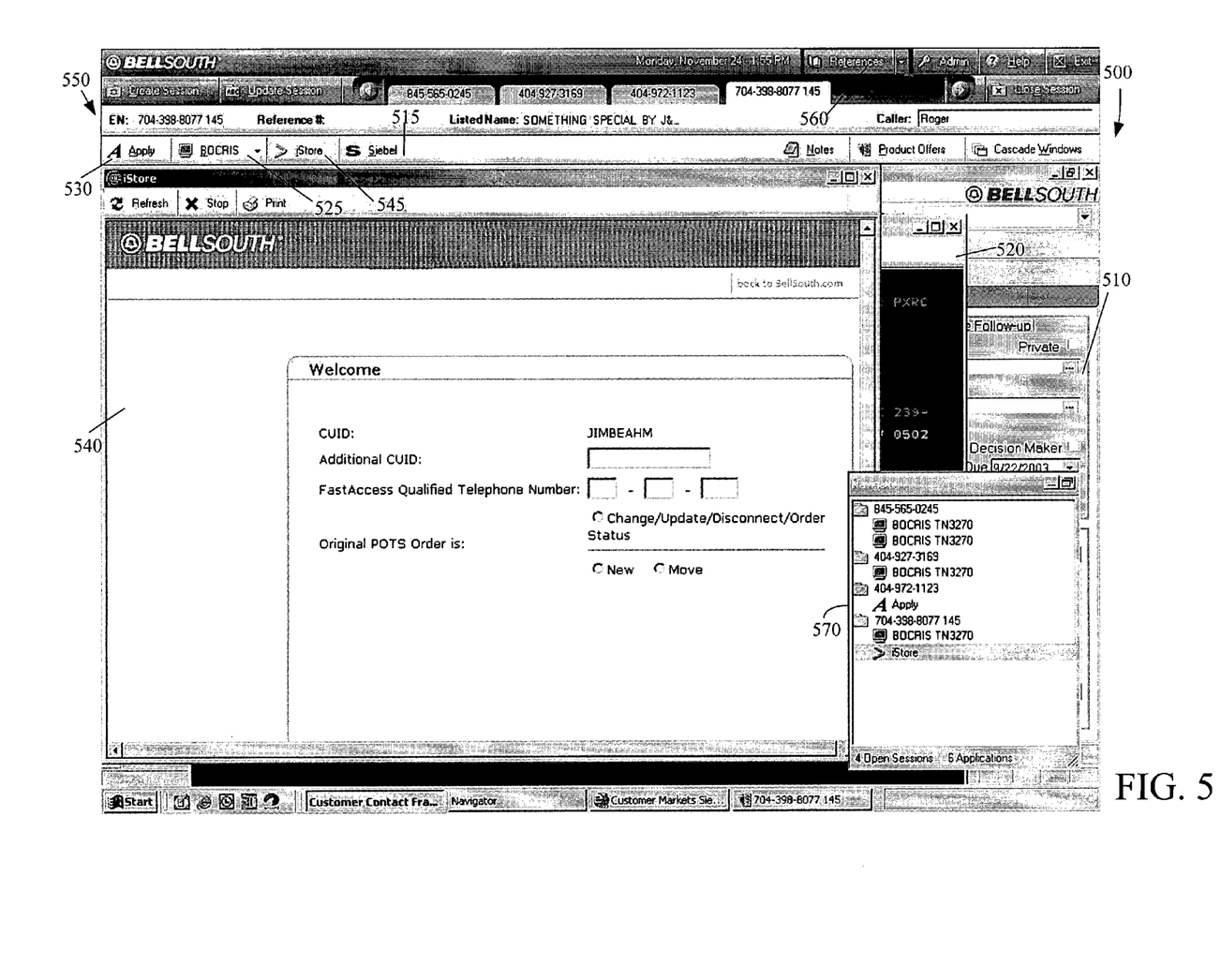
FIG. 5 is a screenshot diagram of one embodiment, among others, of a desktop arrangement of the composite application system of FIG. 1.

Referring now to FIG. 5, a screenshot of one embodiment 500 of a desktop arrangement of the composite application system 100 is shown. As previously mentioned, disparate technologies and applications may be interfaced using the coordination manager 175 system as described in the present disclosure. A variety of the applications and their functions in a call center environment, for some embodiments, are as follows. A Siebel® Call Center application (as represented by window 510 that can be launched by application button 515) allows viewing customer-specific promotions; viewing and performing customer follow-ups; and locating customer records. A Business Office Customer Record Inquiry System (BOCRIS) (as represented by window 520 that can be launched by application button 525) allows viewing detailed billing information including screens directed toward local service itemization (LSI), billing, customer service reports (CSR), pending orders, etc. Also, an Apply web application (or similar application) (that can be launched by application button 530) for processing wireless telecommunication services is integrated into the .NET client of the coordination manager 175, for some embodiments involving call-center environments, in order to view promotions and eligibility; placing orders; and checking customer credit information.

In addition, an iStore web application (or similar application) (that is represented by window 540 that can be launched by application button 545) for processing digital subscriber line (DSL) service orders is integrated into the .NET client of the coordination manager 175. In particular, the iStore web application enables DSL loop qualification & order placement for a call-center environment. Single sign-on support, for some embodiments, is implemented in for the iStore and Apply application classes. An Orbit web application (or similar application) is integrated into the .NET client as a link 560 from the application bar interface 550 for some embodiments. The link 560 launches the Orbit web application. Other embodiments also incorporate other applications such as PC-based applications. As shown, a user-session navigator 570 is provided to enable a user to switch between user sessions and to access different applications.

In some embodiments, Siebel® 6.3 may not be integrated by the coordination manager 175 as a typical hosted application, for example. Because some Siebel® implementations are integrated with CTI 198, Siebel® preferably operates in a process outside of the coordination manager framework. The coordination manager 175 interacts with Siebel® independently of the Application Integration Framework. The coordination manager 175 exposes itself as a COM interface that Siebel® calls to notify the coordination manager 175 of events such as a CTI screen pop. In addition, the coordination manager 175 calls the COM interface (that Siebel® exposes) to retrieve information about the current Siebel® record (telephone number, name, etc.) and the current Siebel® state (page, view, etc.).

For some embodiments, a RUMBA® 3270 Emulator hosts the Business Office Customer Record Inquiry System (BOCRIS) and exposes an Activex® interface that can be integrated by the coordination manager 175. A user control is created to host the Activex® control. The user control hosting the RUMBA Activex® control implements the hosted application Interface. The user control also implements actions that are called by the coordination manager 175, such as logging in the user and navigating to a specific BOCRIS screen.

As previously mentioned with regard to FIG. 4, the toolbar interface 420 contains a variety of buttons to help a user manage and control the presentation of windows displayed on the desktop 410. For example, a Cascade button 460 is shown in FIG. 4. For some embodiments, a user can select the Cascade button 460 in order to arrange all of the windows on the desktop 410 of a current session in a cascade fashion so that the top of each window is accessible. Further, in some embodiments, the windows may be arranged in order of time that the user has most recently accessed each respective window for the current session. For some embodiments, the toolbar interface 420 is registered with the Windows operating system as an AppBar class. Accordingly, the Windows operating system 179 is utilized to help implement the functionality of the Cascade button 460. For example, the location of session windows is provided to the operating system by the application bar interface. Then, the operating system implements the cascade operation for the session windows.

In other embodiments, a Tile button (not shown) may also be employed to arrange windows in a tile arrangement. For a user, this is advantageous because it allows the user to promptly organize his or her desktop in a useful and efficient manner. Although many of the embodiments discussed herein involved call-center environments, the present disclosure is not limited to call-center environments. Other lines of business activities such as those in banking, accounting, etc. are also contemplated.

Figure 6:
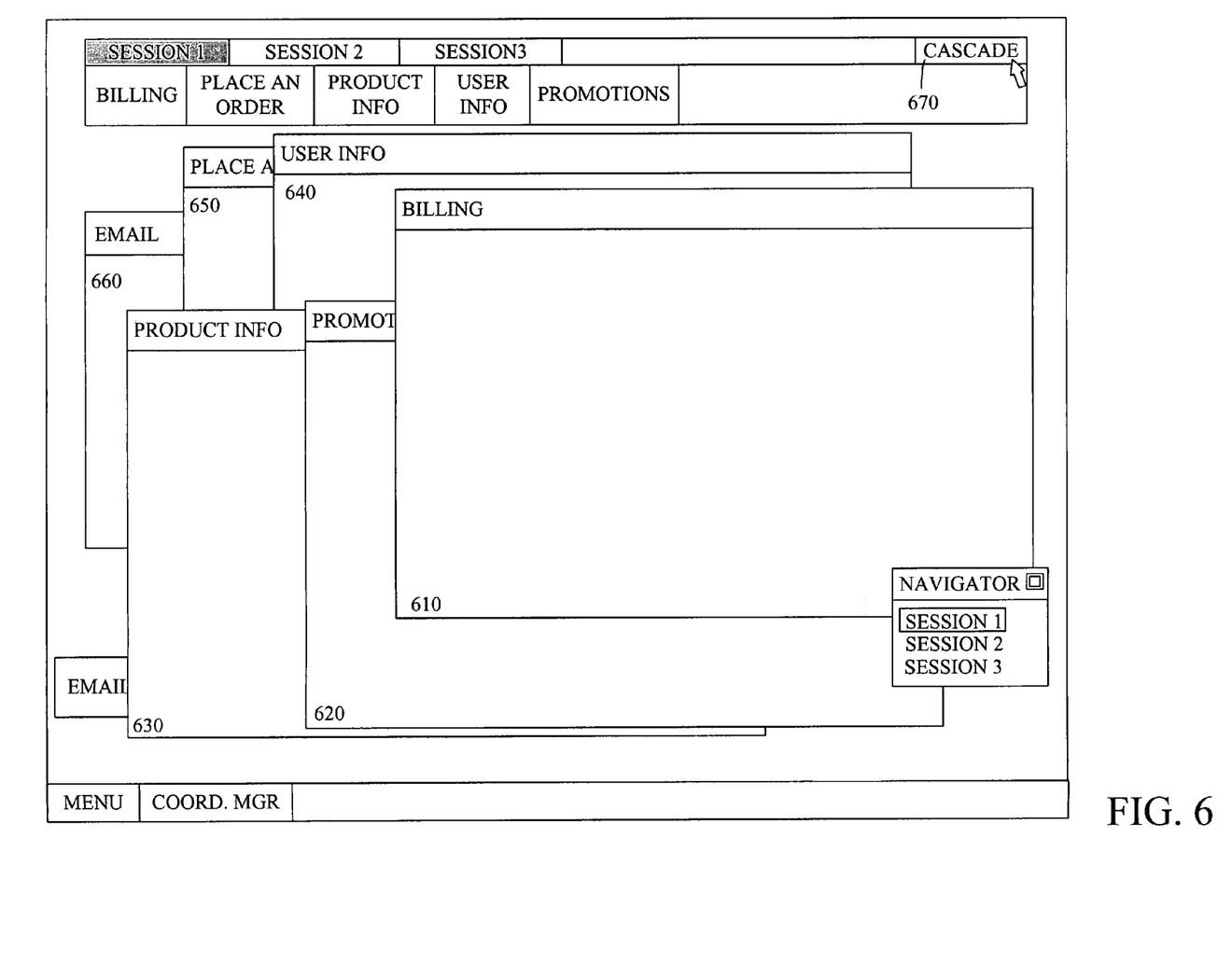
FIGS. 6-7 are diagrams of one embodiment, among others, of a desktop arrangement of the composite application system of FIG. 1.
Figure 7:
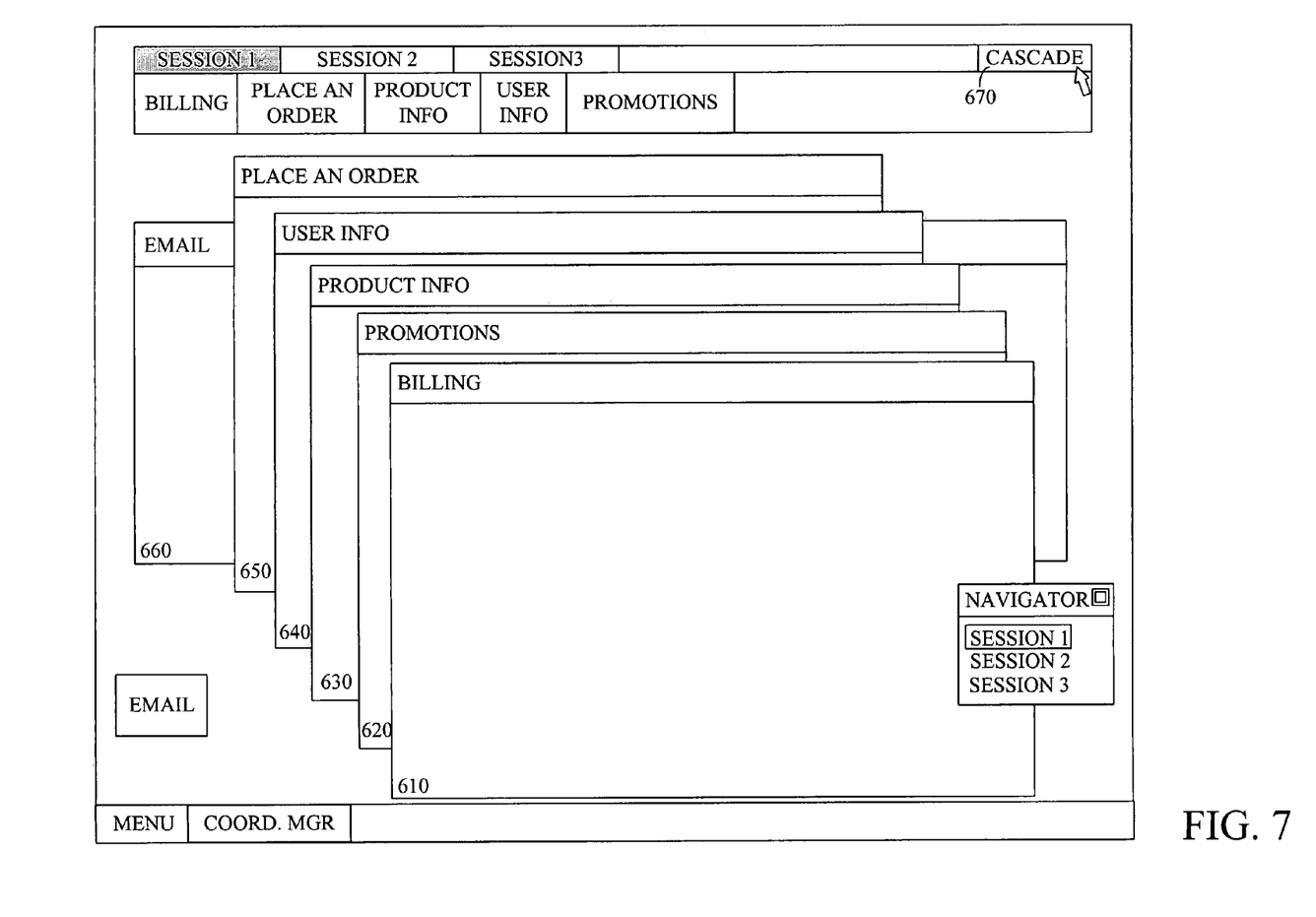

To illustrate a cascade operation for one embodiment of the composite application system 100, FIG. 6 shows a desktop arrangement featuring graphical windows that have been launched for a particular user-session ("Session1"). In particular, windows for "Billing" 610, "Promotions" 620, "Product Info" 630, "User Info" 640, and "Place an Order" 650 applications have been launched within "Session 1." In addition, an "Email" window 660 has been launched outside of "Session 1." By pressing the Cascade button 670, the windows associated with the current session are organized in a cascaded fashion, as shown in FIG. 7. As shown, the windows 610-650 associated with Session 1 are arranged in a cascaded fashion, and the window not associated with Session 1 is not affected by the cascade operation. In a similar manner, when the application bar interface is closed, each of the application windows of user-sessions is also closed, for some embodiments.

Figure 8:
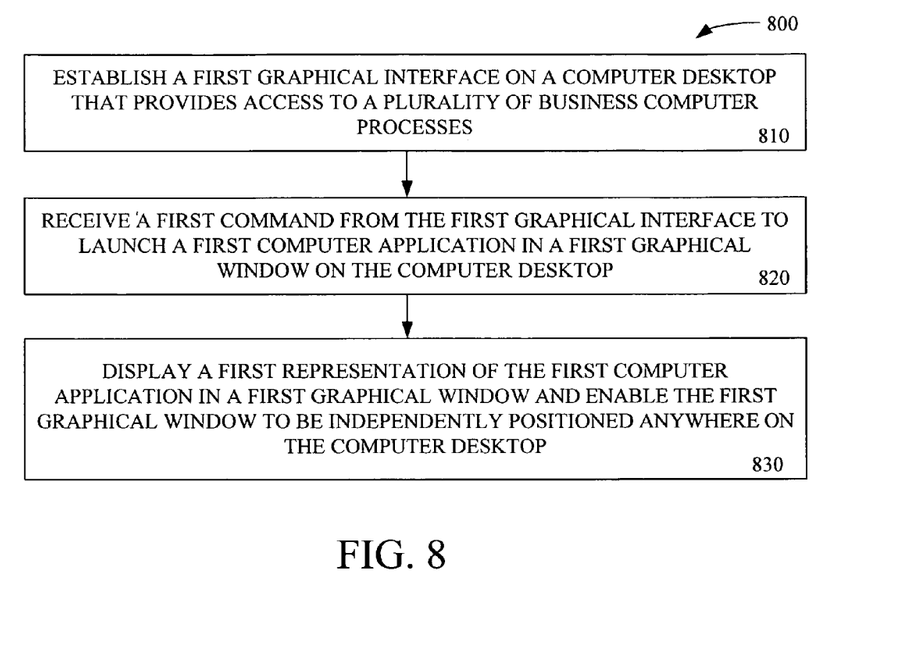
FIGS. 8-10 are flowcharts describing the functionality of various embodiments, among others, of the composite application system of FIG. 1.

As depicted in FIG. 8, the functionality of one embodiment of a composite application system 100 or method 800 may be construed as beginning at the step of establishing (810) a first graphical interface on the desktop that provides access to a plurality of computer applications, e.g., a plurality of business computer processes. Then, a first command is received (820) from the first graphical interface. The first command is to launch a first computer application in a first graphical window on the desktop. As a result, a first representation of the first computer application is displayed (830) in a first graphical window. Further, the first graphical window is capable of being independently positioned anywhere on the desktop. In some embodiments, the first graphical interface is an interface for launching call-center applications. Further, in some embodiments, an application window can be positioned independently from the positioning of first graphical interface and other application windows (by a drag operation using a mouse control, for example).

Figure 9:
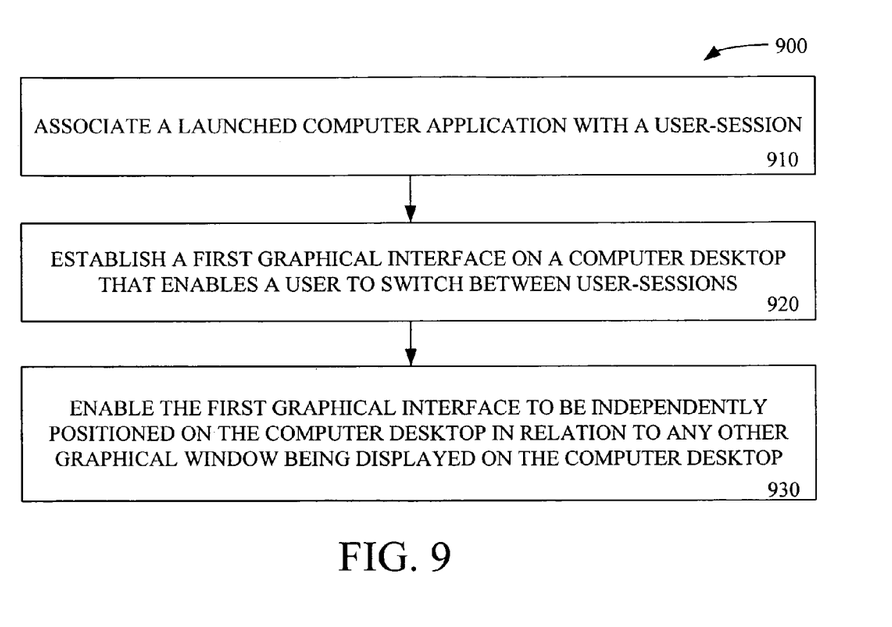

As depicted in FIG. 9, the functionality of another embodiment of the composite application system 100 or method 900 may be construed as beginning at the step of associating (910) a launched computer application with a user-session. Then, a first graphical interface is established (920) on the desktop that enables a user to switch between user-sessions. In particular, the first graphical interface is capable of being independently positioned (930) on the computer desktop in relation to any other graphical window being displayed on the computer desktop. In some embodiments, the first graphical interface is utilized to switch between sessions for call-center applications.

Figure 10:
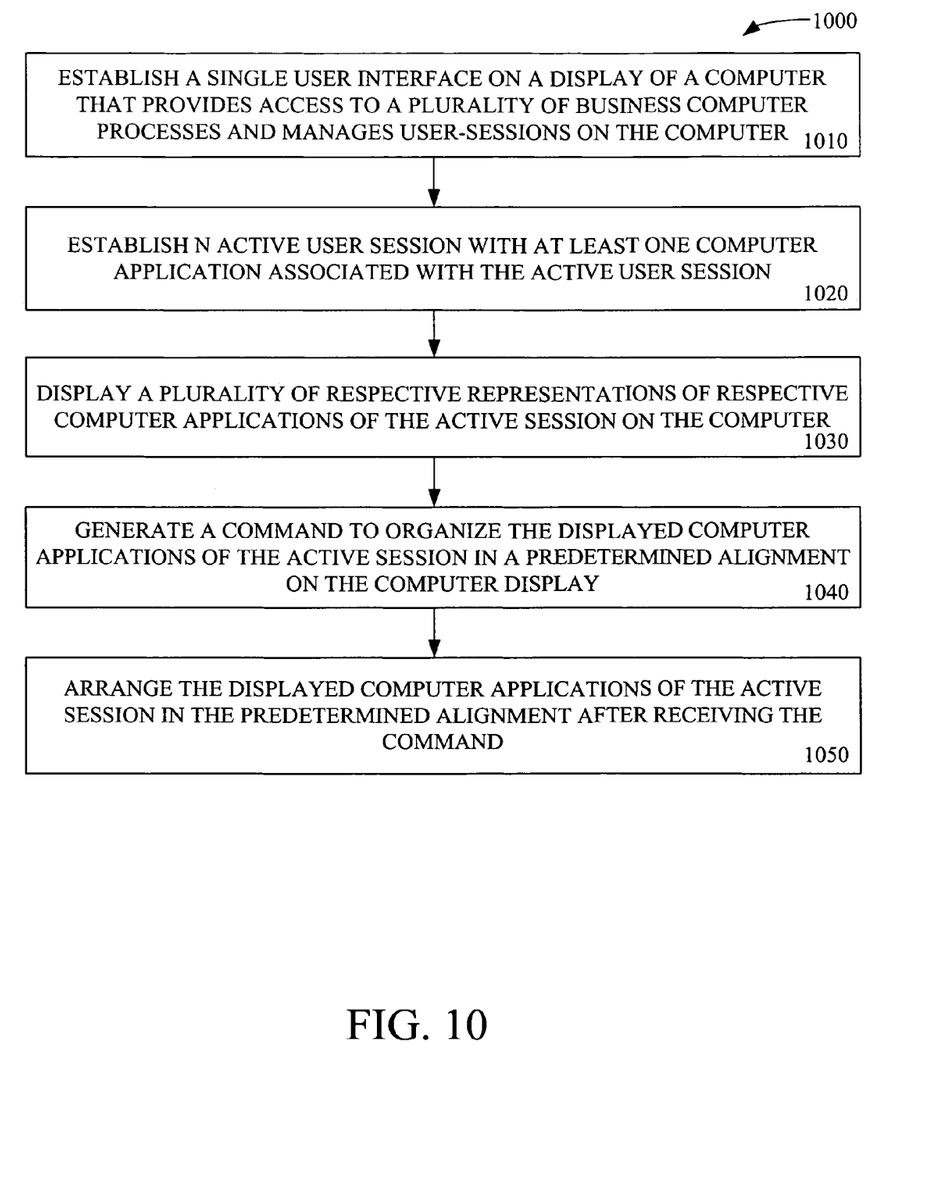

As depicted in FIG. 10, the functionality of another embodiment of the composite application 100 or method 1000 may be construed as beginning at the step of establishing (1010) a single user interface on a display of a computer that provides access to a plurality of business computer processes and manages user-sessions on the computer. Then, an active user session is established (1020) with at least one computer application associated with the active user session. Further, a plurality of respective representations for corresponding respective computer applications of the active session are displayed (1030) on the computer. Next, a user via the computer generates (1040) a command to organize the displayed computer applications of the active session in a predetermined alignment on the computer display. As a result, the displayed computer applications of the active session are arranged (1050) in the predetermined alignment, after receiving the command. In some embodiments, among others, the predetermined alignment is a tiled alignment, a cascaded alignment, etc.

It should be emphasized that the above-described embodiments of the present disclosure, particularly, any "preferred" or "exemplary" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

Therefore, having thus described the invention, at least the following is claimed:

1. A system for organizing session applications on a computer display comprising:
    a computer processor configured to execute:
    logic configured to display a user interface for initiating a command to launch a business application on a computer display of a user;
    logic configured to associated a launched business application with a user-session;
    logic configured to concurrently display all windows attributed to business applications of an active session on the computer display;
    a first user interface control for allowing a user to initiate a command for organizing the displayed windows attributed to business applications of the active session in a predetermined alignment across the computer display so that an existing displayed arrangement of the windows attributed to business applications is to be changed to the predetermined alignment; and
    logic configured to arrange the displayed windows attributed to business applications of the active session after receiving the command from the user such that the launched windows attributed to business applications of the active session are displayed in the predetermined alignment and positioning of a launched window attributed to a computer application not belonging to the active session remains unchanged on the computer display, wherein the windows attributed to displayed applications are arranged in the predetermined alignment in order of most recently accessed by the user.

2. The system of claim 1, wherein the user interface is configured to launch a plurality of business applications for a call-center environment.

3. The system of claim 1, wherein the predetermined alignment is a tiled alignment.

4. The system of claim 1, wherein the predetermined alignment is a cascaded alignment.

5. A method for organizing session applications, comprising:
    establishing a single user interface on a display of a computer that provides access to a plurality of business computer processes and manages user-sessions on the computer;
    establishing an active user session, the active user session having at least one computer application associated with the active user session;
    concurrently displaying a plurality of respective window representations for corresponding respective computer applications of the active session on the display of the computer;
    generating a command to organize the displayed windows attributed to computer applications of the active session in a predetermined alignment on the computer display so that an existing displayed arrangement of the windows attributed to computer applications is to be changed to the predetermined alignment; and
    arranging the displayed windows attributed to computer applications of the active session in the predetermined alignment, after receiving the command such that the launched windows attributed to the computer applications of the active session are displayed in the predetermined alignment and positioning of a launched window attributed to a computer application not belonging to the active session remains unchanged on the computer display, wherein the windows attributed to the displayed applications are arranged in the predetermined alignment in order of most recently accessed by the user.

6. The method of claim 5, wherein the plurality of business computer processes perform tasks pertinent to a call-center environment.

7. The method of claim 5, wherein the predetermined alignment is a tiled alignment.

8. The method of claim 5, wherein the predetermined alignment is a cascaded alignment.

9. A computer-readable storage medium having a program for organizing session applications, the program comprising:
    establishing a single user interface on a display of a computer that provides access to a plurality of business computer processes and manages user-sessions on the computer;
    establishing an active user session, the active user session having at least one computer application associated with the active user session;
    concurrently displaying a plurality of respective window representations for corresponding respective computer applications of the active session on the display of the computer;
    generating a command to organize the displayed windows attributed to computer applications of the active session in a predetermined alignment on the computer display so that an existing displayed arrangement of the windows attributed to computer applications is to be changed to the predetermined alignment; and arranging the displayed windows attributed to computer applications of the active session in the predetermined alignment, after receiving the command such that the launched windows attributed to the computer applications of the active session are displayed in the predetermined alignment and positioning of a launched window attributed to a computer application not belonging to the active session remains unchanged on the computer display, wherein the windows attributed to the displayed applications are arranged in the predetermined alignment in order of most recently accessed by the user.

10. The medium of claim 9, wherein the plurality of business computer processes perform tasks pertinent to a call-center environment.

11. The medium of claim 9, wherein the predetermined alignment is a tiled alignment.

12. The medium of claim 9, wherein the predetermined alignment is a cascaded alignment.

* * * * *